United States Patent [19]

Jensen et al.

[11] Patent Number: 5,935,886
[45] Date of Patent: *Aug. 10, 1999

[54] MAN-MADE VITREOUS FIBRES

[75] Inventors: Soren Lund Jensen, Copenhagen; Vermund Rust Christensen, Roskilde; Marianne Guldberg, Soborg, all of Denmark

[73] Assignee: Rockwool International A/S, Denmark

[*] Notice: This patent is subject to a terminal disclaimer.

[21] Appl. No.: 08/836,537

[22] PCT Filed: Nov. 8, 1995

[86] PCT No.: PCT/EP95/04395

§ 371 Date: May 8, 1997

§ 102(e) Date: May 8, 1997

[87] PCT Pub. No.: WO96/14454

PCT Pub. Date: May 17, 1996

[30] Foreign Application Priority Data

| Nov. 8, 1994 | [GB] | United Kingdom | 9422468 |
| Nov. 23, 1994 | [GB] | United Kingdom | 9424126 |
| Nov. 23, 1994 | [GB] | United Kingdom | 9424127 |
| Jan. 13, 1995 | [GB] | United Kingdom | 9500667 |

[51] Int. Cl.$^6$ .................................................. C03C 13/06
[52] U.S. Cl. ................................ 501/36; 501/38; 501/70; 501/73
[58] Field of Search .................................. 501/35, 36, 38, 501/70, 73

[56] References Cited

U.S. PATENT DOCUMENTS

| 2,020,403 | 11/1935 | Engle . | |
| 2,576,312 | 11/1951 | Minnick | 501/36 |
| 3,736,162 | 5/1973 | Chvalovsky et al. . | |
| 4,002,492 | 1/1977 | Coenen | 501/72 |
| 4,461,840 | 7/1984 | Massol et al. . | |
| 4,560,606 | 12/1985 | Rapp et al. . | |
| 5,037,470 | 8/1991 | Matzen et al. | 501/35 |

FOREIGN PATENT DOCUMENTS

| 0057397 | 8/1982 | European Pat. Off. . |
| 0231691 | 8/1987 | European Pat. Off. . |
| 0583791 | 2/1994 | European Pat. Off. . |
| 2662687 | 6/1990 | France . |
| 0160196 | 4/1989 | Poland . |
| 458522 | 3/1975 | Russian Federation . |
| 649670 | 3/1979 | Russian Federation . |
| 0197942 | 8/1965 | Sweden . |
| 1724613 | 4/1992 | U.S.S.R. . |
| 2152026 | 7/1985 | United Kingdom . |
| 89/12032 | 12/1989 | WIPO . |

OTHER PUBLICATIONS

Fiber Diameter Distributions in typical MMVG Wool Insulation Products, Vermund R. Christensen et al. American Industrial Hygien Assoc., May 1993, pp. 232–238.

Kenneth K. Humphreys, et al., "Coal Ash Usage: Producing Mineral Wool From By–Products", Minerals Processing, Mar. 1970, pp. 16–21.

V.R. Christensen, et al., "Effect of Chemical Composition of Man–Made Vitreous Fibers on the Rate of Dissolution In Vitro at Different pHs", Environmental Health Perspectives 102 (Suppl 5): 83–86 (1994) (no month).

Sylvie Thelohan, et al., "In Vitro Dynamic Solubility Test: Influence of Various Parameters", Environmental Health Perspectives 102 (Suppl 5): 91–96 (1994) (no month).

Mansville, PCT/US87/00313, "Table III", p. 10 (no date).

*Primary Examiner*—Michael Marcheschi
*Attorney, Agent, or Firm*—Ostrolenk, Faber, Gerb & Soffen, LLP

[57] ABSTRACT

Man-made vitreous fibres has a solubility at pH 4.5 of at least 20 nm per day and a melt viscosity of 10–70 poise at 1,400° C. and are formed from a composition which includes 18 to 30% by weight $Al_2O_3$.

17 Claims, No Drawings

MAN-MADE VITREOUS FIBRES

This is based on PCT/EP95/04395, filed Nov. 8, 1995, pursuant to 35 U.S.C. §371.

This invention relates to man-made vitreous fibres (MMVF) which are durable in use but which can be shown to be biologically advantageous.

MMV fibres are made from vitreous melt, such as of rock, slag, glass or other mineral melts. The melt is formed by melting in a furnace a mineral composition having the desired analysis. This composition is generally formed by blending rocks or minerals to give the desired analysis. The mineral composition often has an analysis, as oxides, which includes at least 32% $SiO_2$, below 30% $Al_2O_3$ and at least 10% CaO. The elemental analyses in the specification are by weight and calculated as oxides. The iron oxide may be a mixture of FeO and $Fe_2O_3$ but is quoted herein as FeO.

Efficient and cost-effective formation of the melt in the furnace and of the fibres from the melt requires that the composition should have a suitable liquidus temperature and should have a suitable viscosity during the fibre-forming process. These requirements impose constraints on the selection of the composition that is to be melted.

Although there is no scientific evidence establishing that there is a health risk associated with the manufacture and use of MMV fibres, commercial interests have led manufacturers to provide MMV fibres that retain the required physical properties of MMV fibres (e.g., durability at elevated temperatures and under humid conditions) but which can also be alleged to be of improved biological safety.

This allegation of improved safety is usually made on the basis of an in vitro test that examines the dissolution rate or degradability of the fibres in a liquid which is intended to simulate lung liquid, such as Gamble's solution with pH 7.4 to 7.8. A consequence of enhanced dissolution rate at pH 7.5 is that the fibres will normally have reduced resistance to humidity.

Numerous patent applications have been published describing fibres that give enhanced dissolution rate in such an in vitro test, such as WO87/05007, WO89/12032, EP 412878, EP459897, WO92/09536, WO93/22251 and WO94/14717.

A characteristic of many of these patent applications, and of fibres which are alleged to have enhanced dissolution rate in such in vitro tests, is that the fibre should have reduced aluminium content. For instance, it is stated in WO87/05007 that the $Al_2O_3$ amount must be below 10%. The aluminium content of rock wool and slag wool is generally in the range 5 to 15% (measured as $Al_2O_3$ by weight) and many of these allegedly biologically suitable fibres have an aluminium content of below 4%, and often below 2%. It is known to include phosphorous in these low-$Al_2O_3$ compositions in order to increase the dissolution rate in this pH 7.5 dissolution rate test.

A problem with many of these low-$Al_2O_3$ fibres (in addition to uncertainty as to whether they do have enhanced biological suitability) is that the melt properties are not entirely satisfactory for manufacture in conventional or easily adapted melting and fibre-forming apparatus. For instance, the melt viscosity at convenient fibre-forming temperatures may be rather low. Another problem is that a high dissolution rate at pH 7.5 may tend to result in reduced durability under humid conditions which may be experienced after installation.

In addition to the in vitro tests, in vivo research testing has been conducted. For instance, Oberdörster in VDI Berichte 853, 1991, pages 17 to 37 showed that two basic mechanisms are involved in the clearance of fibres from the lungs, namely dissolution in the near-neutral lung fluid and dissolution in the acidic environment (maintained at pH 4.5 to 5) created around fibres surrounded by macrophages in the lung. It is believed macrophages promote removal of the fibres from the lung by promoting local dissolution of the surrounded fibre area leading to weakening and breaking of the fibres so as to reduce the average fibre length, thereby enabling macrophages to engulf and transport the shorter fibres out of the lung. This mechanism is illustrated in the article by Morimoto et al in Occup. Environ. Med 1994, 51, 62–67 and especially FIGS. 3 and 7 and articles by Luoto et al in Environmental Research 66 (1994) 198–207 and Staub-Reinhaltung der Luft 52 (1992) 419–423.

Traditional glass fibres and many of the MMV fibres claimed to have increased solubility in lung fluid (at pH 7.5) have a worse solubility at pH 4.5 than at pH 7.5 and so presumably attack by macrophages would not contribute significantly to the shortening and final removal of the fibres from the lung.

Existing MMV fibres formed from rock, slag and other relatively high alkaline earth mixtures can have a higher dissolution rate at pH 4.5 than pH 7.5 but tend to have a low melt viscosity. Existing fibres do not have a satisfactory combination of dissolution rate at pH 4.5 with melt properties. Fibres which are currently alleged to be preferred on the basis of in vitro tests tend to have low melt viscosity when they have the required low aluminium content. The low melt viscosity inevitably reduces production efficiency compared to normal production.

It would be desirable to provide MMV fibres which can be shown, by dissolution rate at pH 4.5, to be biodegradable in the lung, have melt properties which allow for normal, high, production efficiency and which can be made from inexpensive raw materials. Preferably they have good weathering resistance when exposed to ambient humid conditions in use.

According to the invention, man-made vitreous fibres are formed of a composition which has a viscosity at 1400° C. of 10 to 70 poise and which has an analysis, measured as weight of oxides, which includes

| | |
|---|---|
| $SiO_2$ | 32 to 48% |
| $Al_2O_3$ | 18 to 30% |
| CaO | 10 to 30% |
| MgO | 2 to 20% |
| FeO | 2 to 15% |
| $Na_2O + K_2O$ | 0 to 10% |
| $TiO_2$ | 0 to 6% |
| Other Elements | 0 to 15% | and the fibres have a dissolution rate at pH 4 to 5 of at least 20 nm per day.

It is surprisingly possible, in accordance with the invention, to provide fibres which have a good dissolution rate at pH 4.5 thereby facilitating clearance from the lungs by macrophages (thus promoting genuine biodegradability), even though the fibres can have low or moderate dissolution rate at pH 7.5. This allows maintenance of good stability under humid conditions (without loss of biodegradability). The fibres can have reasonably conventional melt characteristics such as liquidus temperature, crystallisation rate and melt viscosity. The fibres can be formed using inexpensive raw materials.

Another advantage of the fibres is that when they are exposed to humidity and condensed water, the resultant solution that is formed containing dissolution products has increased pH but the fibres may have reduced solubility at increased pH and so they may dissolve less and have increased durability.

It is possible to select elemental analyses within the ranges given herein so as to obtain the defined combination of melt viscosity and dissolution rate at pH 4.5. Also, it is easily possible to select the composition such that the composition and the fibres comply with other desirable properties, such as liquidus temperature and sintering temperature.

For instance, if it is found that the viscosity at 1400° C. of any particular melt is too high, it may be possible to reduce it by reducing the total amount of $SiO_2+Al_2O_3$. Similarly, if the melt viscosity is too low, it may be possible to increase it by raising the total amount of $SiO_2+Al_2O_3$, generally within the range of 55 to 75%, often 60 to 75%, or by increasing the amount of alkali oxide. Similarly, it may be possible to decrease the viscosity by increasing the total amount of alkaline earth metal oxide components and FeO.

If the rate of dissolution at pH 4.5 is too low, it may be possible to increase it by decreasing the amount of $SiO_2$, but it may then be necessary to increase the amount of $Al_2O_3$ in order to maintain melt properties.

The amount of $SiO_2$ is normally at least 32%, often at least 34% and preferably at least 35%. It is normally below 47% and preferably below 45%. Amounts of 38 to 42% are often preferred.

The amount of $Al_2O_3$ is normally at least 18%, often at least 19% but preferably at least 20% and often at least 24%. It is normally below 28% and preferably below 26%. Amounts of 20 to 23% are often preferred.

The combined amount of $SiO_2+Al_2O_3$ is normally 55 to 75%, usually at least 56% and preferably at least 57%. In preferred products it is often above 60%, most preferably at least 61 or 62%. It is normally below 70% or 68% and preferably below 65%. Generally the combined amount is within the range 57 to 70%.

The amount of CaO is normally at least 14% and preferably at least 18%. It is normally below 28% and preferably below 25%. Amounts of 14 to 20% are often preferred.

The amount of MgO is normally at least 5%, preferably at least 6% and often at least 8%. It is normally below 15%, preferably below 11%. Amounts of 7–12% are often preferred.

The amount of FeO is normally at least 3% and preferably at least 5%. It is normally below 12%, preferably below 10% and most preferably below 8%. Amounts of 5 to 7% are often preferred.

Preferably CaO+MgO+FeO is 25 to 40%.

The combined amount of alkali ($Na_2O+K_2O$) is usually at least 1% and preferably at least 2%. It is usually below 5% and preferably below 3%.

The composition often includes $TiO_2$ in an amount of up to 3% or 4%, usually up to 2%. The amount of $TiO_2$ is usually at least 0.2%, often at least 0.5 or 1%.

A variety of other elements can be present in the composition in any amount that does not detract from the desired properties Examples of other elements that can be included are $P_2O_5$, $B_2O_3$, BaO, $ZrO_2$, MnO, ZnO and $V_2O_5$.

It is often desirable to include $P_2O_5$ and/or $B_2O_3$, for instance to adjust melt properties or to adjust solubility. The total amount of $P_2O_5$ and $B_2O_3$ is generally not more than 10%. The amount of $P_2O_5$ is usually more than the amount of $B_2O_3$ and is usually at least 1% or 2%. Often $B_2O_3$ is absent. Preferably there is 1 to 8%, usually 1 to 5%, $P_2O_5$ and 0 to 5% $B_2O_3$ (often 1 to 4% $B_2O_3$).

The total amount of these various other elements is usually below 15% and often below 10% or 8%. Each of the other elements which is present is normally present in an amount of not more than 2%, although $P_2O_5$ and/or $B_2O_3$ can be present in larger quantities.

The melt can have normal crystallisation characteristics, but when it is desired to minimise crystallisation this can be achieved by including magnesium in a rather low amount for instance 2 to 6% MgO.

When it is desired to provide fibres having improved fire resistance, it is generally desired to increase the amount of FeO, which preferably is then at least 6%, for instance up to 8% or higher, for instance 10%, and the MgO should then be at least 8%.

The analysis of the composition is preferably such that the fibres have a dissolution rate at pH 4.5 of at least 25, and preferably at least 40, nm per day. It is desirable for the dissolution rate to be as high as possible (consistent with retention of adequate humidity and heat resistance properties) but it is generally unnecessary for it to be above 150 or 100 nm per day and it is usually below 80 nm per day.

Although a high dissolution rate at pH 7.5 has been proposed as a desirable property (as an indication of alleged biodegradability), in fact it is often an undesirable property since it is an indication of poor weathering resistance when exposed to humidity. Dissolution in the lungs at pH 7.5 is not exclusively necessary for the fibres to be biodegradable. Preferably the fibres have a dissolution rate in Gamble's solution at pH 7.5 of below 25, and most preferably below 15, nm per day.

The viscosity of the composition at 1400° C. is usually at least 12 or 15 poise and is preferably at least 18 poise. Although it can be as high as, for instance, 60 poise it is generally below 40 poise and preferably it is not more than 30 poise.

When it is desired that the fibres should have good fire resistance, the analysis is preferably such that the sintering temperature is at least 800° C. and preferably at least 1,000° C.

The liquidus temperature is usually at least 1200° C. but often at least 1240° C. It can be as high as, for instance, 1400° C. but preferably it is not more than 1340° C.

An advantage of the use of the moderate aluminium melts defined for use in the invention is that it permits the inclusion in the composition of readily available materials having a moderate aluminium content such as rock, sand and waste. This therefore minimises the need to use expensive, high alumina materials such as bauxite or kaolin, and minimises at the same time the need to use expensive very low alumina materials such as silica sand or olivine sand, iron ore, etc. These more expensive materials may however be used if desired. Typical, readily available, medium alumina materials that may be used as part or all of the composition include anorthosite and phonolite and gabbros.

The composition is typically formed by blending appropriate amounts of naturally occurring rock and sand materials such as anorthosite, gabbros, limestone, dolomite, diabase, apatite, boron-containing materials, and waste materials such as mineral wool waste, alumina silicates, slag, in particular high alumina (20–30%) slags such as ladle slag, foundry sand, filter dust, fly ash, bottom ash and high alumina waste from the production of refractory materials.

The composition can be converted to a melt in conventional manner, for instance in a gas heated furnace or in an electric furnace or in a cupola furnace. An advantage of the invention is that the composition can easily have a reasonably low liquidus temperature (while is maintaining adequate viscosity at 1400° C.) and this minimises the amount of energy that is required for forming the melt.

The melt can be converted to fibres in conventional manner, for instance by a spinning cup process or by a cascade rotor process, for instance as described in WO92/06047.

The fibres of the invention can have any convenient fibre diameter and length.

In this invention, dissolution rate is determined using the following test protocol.

300 mg of fibres are placed in polyethylene bottles containing 500 ml of a modified Gamble's solution (i.e., with completing agents), adjusted to pH 7.5 or 4.5, respectively. Once a day the pH is checked and if necessary adjusted by means of HCl.

The tests are carried out during a one week period. The bottles are kept in water bath at 37° C. and shaken vigorously twice a day. Aliquots of the solution are taken out after one and four days and analysed for Si on a Perkin-Elmer Atomic Absorption Spectrophotometer.

The modified Gamble's solution has the following composition:

|  | g/l |
|---|---|
| $MgCl_2.6H_2O$ | 0.212 |
| NaCl | 7.120 |
| $CaCl_2.2H_2O$ | 0.029 |
| $Na_2SO_4$ | 0.079 |
| $Na_2HPO_4$ | 0.148 |
| $NaHCO_3$ | 1.950 |
| $(Na_2$-tartrate$).2H_2.O$ | 0.180 |
| $(Na_3$-citrate$).2H_2O$ | 0.152 |
| 90% lactic acid | 0.156 |
| Glycine | 0.118 |
| Na-pyruvate | 0.172 |
| Formalin | 1 ml |

The fibre diameter distribution is determined for each sample by measuring the diameter of at least 200 individual fibres by means of the intercept method and a scanning electron microscope or optical microscope (1000× magnification). The readings are used for calculating the specific surface of the fibre samples, taking into account the density of the fibres.

Based on the dissolution of $SiO_2$ (network dissolution), the specific thickness dissolved was calculated and the rate of dissolution established (nm/day). The calculations are based on the $SiO_2$ content in the fibres, the specific surface and the dissolved amount of Si.

In this specification, the sintering temperature is determined by the following test protocol.

A sample (5×5×7.5 cm) of mineral wool made of the fibre composition to be tested is placed in a furnace pre-heated to 700° C. After 1.5 hours exposure the shrinkage and the sintering of the sample are evaluated. The method is repeated each time with a fresh sample and a furnace temperature 50° C. above the previous furnace temperature until the maximum furnace temperature is determined, at which no sintering or no excessive shrinkage of the sample is observed.

In this specification, the viscosity in poise at 1400° C. is calculated according to Bottinga and Weill, American Journal of Science Volume 272, May 1972, page 455–475.

The following are examples of the invention.

In each example, a composition was formed by blending appropriate portions of raw materials and was melted in a crucible furnace and was fiberised by the cascade spinner technique. The analyses of the compositions and their properties are quoted in the following tables. Products A to Q are products according to the invention.

Product V has an analysis similar to commercial slag wool and it will be observed that it has a relatively low aluminium content, a high calcium content and a rather low melt viscosity and a moderate dissolution value at pH 7.5. Product X is somewhat similar to the slag wool V but still has a melt viscosity that is rather low for convenient spinning. Further, the fibre thermal stability is low due to the low content of FeO and MgO.

Product Y is a high aluminium product but the proportions of all the components are such that the melt viscosity is too high for convenient spinning.

Product Z is similar to a conventional rock wool product with normal good product properties but has a very low dissolution rate at pH 4.5. It has a rather high silica content and a rather low alumina content.

| Fibre Types | $SiO_2$ % | $Al_2O_3$ % | $TiO_2$ % | FeO % | CaO % | MgO % | $Na_2O$ % | $K_2O$ % | Visc. poise 1400° C. | Diss. rate pH 7.5 (st) nm/day | Diss. rate pH 4.5 (st) nm/day | Sintering temp ° C. |
|---|---|---|---|---|---|---|---|---|---|---|---|---|
| A | 34.5 | 28.0 | 1.8 | 3.3 | 25.4 | 5.6 | 0.6 | 0.8 | 21.2 | 9.5 | 34.8 | >800 |
| B | 36.2 | 26.3 | 1.9 | 4.9 | 17.7 | 10.8 | 1.0 | 1.1 | 19.4 | 6.8 | 45.1 | >800 |
| C | 38.3 | 25.0 | 1.7 | 3.0 | 24.9 | 5.6 | 0.7 | 0.8 | 24.7 | 7.4 | 53.8 | >800 |
| D | 38.1 | 24.7 | 1.8 | 4.6 | 17.4 | 11.3 | 1.2 | 0.8 | 20.0 | 7.9 | 64.2 | >800 |
| E | 43.2 | 20.0 | 1.6 | 5.0 | 16.6 | 11.5 | 1.2 | 0.8 | 22.8 | 5.0 | 57.9 | >800 |
| F | 43.2 | 19.8 | 1.5 | 3.4 | 24.7 | 5.6 | 1.0 | 0.8 | 27.1 | 4.8 | 47.0 | >800 |
| G | 47.7 | 19.4 | 0.8 | 3.7 | 16.6 | 10.8 | 0.4 | 0.4 | 34.7 | 3.0 | 21.0 | >800 |
| H | 43.7 | 18.8 | 3.6 | 5.4 | 16.4 | 9.7 | 1.8 | 0.7 | 25.1 | 5.8 | 38.6 | >800 |
| I | 45.6 | 18.1 | 1.5 | 5.3 | 16.5 | 9.7 | 2.5 | 0.7 | 30.8 | 3.1 | 44.4 | >800 |
| J | 46.9 | 18.9 | 0.5 | 3.3 | 17.0 | 9.5 | 3.4 | 0.5 | 44.0 | 0.9 | 35.2 | >800 |
| K | 44.1 | 18.7 | 1.6 | 5.2 | 16.5 | 9.8 | 3.3 | 0.7 | 30.3 | 2.6 | 41.1 | >800 |
| L | 39.6 | 24.3 | 1.8 | 3.2 | 21.7 | 6.7 | 1.8 | 0.8 | 30.8 | 5.7 | 49 | >800 |
| M | 43.8 | 20.4 | 1.2 | 10.3 | 15.6 | 8.3 | 0.2 | 0.3 | 21.9 | 3.9 | 39.7 | >1000 |
| N | 42.9 | 23.2 | 0.7 | 8.8 | 17.5 | 5.1 | 0.6 | 1.4 | 36.8 | — | 45.9 | >900 |
| O | 43.1 | 19.9 | 1.6 | 10.1 | 15.0 | 9.3 | 0.6 | 0.4 | 19.8 | 4.6 | 51.9 | >1000 |
| P | 37.8 | 18.3 | 0.9 | 12.0 | 15.8 | 10.1 | 4.7 | 0.3 | 15.0 | 10.2 | 61.5 | >1000 |
| Q | 40.0 | 22.2 | 2.0 | 7.5 | 15.2 | 10.7 | 1.5 | 0.8 | 19.4 | 7.1 | 61.1 | >1000 |
| V | 42.7 | 8.8 | 0.3 | 0.4 | 36.9 | 9.4 | 0.7 | 0.3 | 8.2 | 13.9 | 41.1 | >700 |
| X | 43.1 | 14.0 | 0.7 | 0.5 | 34.3 | 5.2 | 0.7 | 1.5 | 15.2 | 1.5 | 59.8 | >700 |
| Y | 39.7 | 32.8 | 1.7 | 7.0 | 15.7 | 2.1 | 0.3 | 0.7 | 100.0 | 7.8 | 59.3 | >1000 |
| Z | 46.9 | 13.2 | 3.0 | 6.4 | 17.1 | 9.4 | 2.6 | 1.3 | 23.7 | 2.0 | 3.0 | >1000 |

The novel fibres may be provided in any of the forms conventional for MMV fibres. Thus they may be provided as a product consisting of loose, unbonded fibres. More usually they are provided with a bonding agent, for instance as a result of forming the fibres and connecting them in conventional manner. Generally the product is consolidated as a slab, sheet or other shaped article.

Products according to the invention may be formulated for any of the conventional purposes of MMV fibres, for instance as slabs, sheets, tubes or other shaped products that are to serve as thermal insulation, fire insulation and protection or noise reduction and regulation, or in appropriate shapes for use as horticultural growing media, or as free fibres for reinforcement of cement, plastics or other products or as a filler.

We claim:

1. A product comprising man-made vitreous fibres formed of a composition which includes, by weight of oxides, SiO₂ 32 to 48%

Al₂O₃ 18 to 30%

CaO 10 to 30%

MgO 5 to 20%

FeO 5 to below 10%

Na₂O+K₂O 0 to 10%

TiO₂ 0 to 4%

Other Elements 0 to below 8% wherein the composition has a viscosity at 1400° C. of 12 to 70 poise, and wherein the fibres have (a) a dissolution rate of at least 20 nm per day when measured at a pH of 4.5, and (b) a sintering temperature of at least 800° C.

2. A product according to claim 1 in which the amount of FeO is from 5 to below 8%.

3. A product according to claim 1 in which the amount of Al₂O₃ is at least 19%.

4. A product according to claim 1 in which the amount of CaO is at least 18%.

5. A product according to claim 1 in which the amount of SiO₂ is at least 35%.

6. A product according to claim 1 in which the composition has a viscosity of 15 to 40 poise at 1400° C.

7. A product according to claim 1 in which the composition has a viscosity of 18 to 30 poise at 1400° C.

8. A product according to claim 1 in which the fibres have a sintering temperature of at least 1000° C.

9. A product according to claim 1 in which the amount of SiO₂+Al₂O₃ is 60 to 75% and the amount of Na₂O+K₂O is 0 to 7%.

10. A product according to claim 1 in which the amount of SiO₂ is 34 to 45%, the amount of Al₂O₃ is 19 to 28%, the amount of CaO is 14 to 25%, the amount of MgO is 6 to 15%, the amount of FeO is 5 to 8%, and the amount of Na₂O+K₂O is below 5%.

11. A product according to claim 1 in which the fibres have a dissolution rate at pH 7.5 of less than 15 nm per day.

12. A product according to claim 1 in which the amount of SiO₂+Al₂O₃ is 55 to 75%.

13. A product according to claim 1 in which the amount of SiO₂+Al₂O₃ is 61 to 68%.

14. A product according to claim 1 in which the amount of Al₂O₃ is 20 to 26%.

15. A product according to claim 1 in which the amount of MgO is at least 8% and the amount of FeO is from 6 to below 10%.

16. A product according to claim 1 in which the composition has a liquidus temperature of 1240 to 1340° C.

17. A product according to claim 1 in which the amount of SiO₂ does not exceed 42%.

* * * * *